US007362466B2

(12) United States Patent
Semma et al.

(10) Patent No.: US 7,362,466 B2
(45) Date of Patent: Apr. 22, 2008

(54) IMAGE FORMING APPARATUS AND REPLACEABLE PART AND IC CHIP FOR THE SAME

(75) Inventors: Toshitaka Semma, Kanagawa (JP); Hiroyuki Nagashima, Kanagawa (JP); Takamasa Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 907 days.

(21) Appl. No.: 09/997,002

(22) Filed: Nov. 30, 2001

(65) Prior Publication Data

US 2002/0064389 A1 May 30, 2002

(30) Foreign Application Priority Data

Nov. 30, 2000 (JP) ............................ 2000-364113

(51) Int. Cl.
*G06F 15/00* (2006.01)

(52) U.S. Cl. .................... 358/1.18; 358/1.9; 358/1.16; 399/24; 399/25; 399/59; 399/111

(58) Field of Classification Search ............... 358/1.18, 358/1.9, 1.16; 399/24, 25, 59, 111
See application file for complete search history.

(56) References Cited

U.S. PATENT DOCUMENTS

| | | | | |
|---|---|---|---|---|
| 5,012,286 A * | 4/1991 | Kawano et al. | ............... | 399/59 |
| RE35,751 E * | 3/1998 | Midgley | ...................... | 399/25 |
| 5,937,225 A * | 8/1999 | Samuels | ...................... | 399/27 |
| 6,016,409 A * | 1/2000 | Beard et al. | .................. | 399/33 |
| 6,158,837 A * | 12/2000 | Hilton et al. | ................. | 347/19 |

FOREIGN PATENT DOCUMENTS

| | | |
|---|---|---|
| JP | 62-063958 | 3/1987 |
| JP | 4-053970 | 2/1992 |
| JP | 7-168485 | 7/1995 |
| JP | 9-190137 | 7/1997 |
| JP | 10-049031 | 2/1998 |
| JP | 10-052964 | 2/1998 |

(Continued)

OTHER PUBLICATIONS

U.S. Appl. No. 09/994,620, filed Nov. 28, 2001, pending.

(Continued)

*Primary Examiner*—Twyler Lamb
*Assistant Examiner*—Yixing Qin
(74) *Attorney, Agent, or Firm*—Oblon, Spivak, McClelland, Maier & Neustadt, P.C.

(57) ABSTRACT

An image forming apparatus of the present invention includes an apparatus body. An image forming device included in the apparatus is at least partly implemented by a replaceable part. A counter counts prints output by the apparatus with the replaceable part. A memory and a first nonvolatile memory are built in the apparatus body. A second nonvolatile memory is built in the replaceable part. A controller writes a limit number of prints particular to the replaceable part in the first nonvolatile memory, stores, after image forming operation, a cumulative number of prints counted by the counter in the memory and second nonvolatile memory, and reports the time for replacing the replaceable part when the cumulative number stored in the memory exceeds the limit number of prints stored in the first nonvolatile memory.

32 Claims, 12 Drawing Sheets

FOREIGN PATENT DOCUMENTS

| | | |
|---|---|---|
| JP | 10-198236 | 7/1998 |
| JP | 11-272350 | 10/1999 |

OTHER PUBLICATIONS

U.S. Appl. No. 09/997,002, filed Nov. 30, 2001, pending.
U.S. Appl. No. 09/997,002, filed Nov. 30, 2001, Semma et al.
U.S. Appl. No. 10/654,960, filed Sep. 5, 2003, Enami et al.
U.S. Appl. No. 10/660,620, filed Sep. 12, 2003, Murakami et al.
U.S. Appl. No. 10/665,825, filed Sep. 22, 2003, Yoshizawa et al.
U.S. Appl. No. 10/703,447, filed Nov. 10, 2003, Yoshiyuki et al.
U.S. Appl. No. 10/874,269, filed Jun. 24, 2004, Murakami et al.
U.S. Appl. No. 10/836,264, filed May 3, 2004, Shintani et al.
U.S. Appl. No. 10/820,726, filed Apr. 9, 2004, Koike et al.
U.S. Appl. No. 10/737,867, filed Dec. 18, 2003, Hayashi et al.

* cited by examiner

IMAGE FORMING APPARATUS AND REPLACEABLE PART AND IC CHIP FOR THE SAME

BACKGROUND OF THE INVENTION

1. Field of the Invention

The present invention relates to a printer, copier, facsimile apparatus or similar image forming apparatus and more particularly to an image forming apparatus capable of managing the limit of use of a process cartridge or similar replaceable part thereof to thereby promote sure maintenance, and a replaceable part and an IC (Integrated Circuit) chip for the same.

2. Description of the Background Art

In an electrophotographic image forming apparatus, a photoconductive element, toner and so forth joining in an image forming process each are usable only for a preselected period due to wear and other causes. Such parts have customarily been constructed into replaceable process cartridges to be replaced by the user.

It is a common practice to manage the time for replacing a process cartridge to thereby allow the cartridge to be replaced before it approaches the limit of use and effects, e.g., image quality. The management may be based on the number of prints from which the amount of use of the process cartridge can be estimated. In light of this, the number of prints output with a process cartridge is counted in order to store the cumulative number of prints in a memory, which is built in the cartridge. When the cumulative number of prints reaches a limit number of prints assigned to the process cartridge, a time for replacing the cartridge is reported.

The memory of the process cartridge has customarily stored various kinds of management data including not only the cumulative number of prints and limit number of prints but also. ID information particular to the cartridge. The memory therefore needs a great capacity. On the other hand, the apparatus body processes all of such data, i.e., identifies the process cartridge, determines the cumulative number of prints, and determines whether or not the cumulative number of prints has reached the limit number of prints. Data should therefore be transferred from the process cartridge to the apparatus body each time of processing, slowing down the overall processing.

Generally, the limit number of use assigned to the process cartridge is fixed without regard to the sheet size, image ratio and other image forming conditions, which are dependent on the user. It follows that a toner cartridge, for example, storing much toner and therefore bulky and expensive is necessary for a user whose deals with images having an extremely high image ratio. Conversely, as for a user dealing with images having a low image ratio, such a toner cartridge would reach the limit number of use with much toner left therein.

Technologies relating to the present invention are disclosed in, e.g., Japanese Patent Laid-Open Publication Nos. 10-49031, 10-52964 and 10-198236.

SUMMARY OF THE INVENTION

It is an object of the present invention to provide an image forming apparatus capable of executing rapid data processing for the management of the limit of use cartridge by cartridge, preparing adequate data for managing the limit of use in accordance with the image forming condition to thereby promote adequate management and maintenance, and preventing a cartridge from increasing in size and cost, and a replaceable part and an IC chip for the same.

An image forming apparatus of the present invention includes an apparatus body. An image forming device included in the apparatus is at least partly implemented by a replaceable part. A counter counts prints output by the apparatus with the replaceable part. A memory and a first nonvolatile memory are built in the apparatus body. A second nonvolatile memory is built in the replaceable part. A controller writes a limit number of prints particular to the replaceable part in the first nonvolatile memory, stores, after image forming operation, a cumulative number of prints counted by the counter in the memory and second nonvolatile memory, and reports the time for replacing the replaceable part when the cumulative number stored in the memory exceeds the limit number of prints stored in the first nonvolatile memory.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
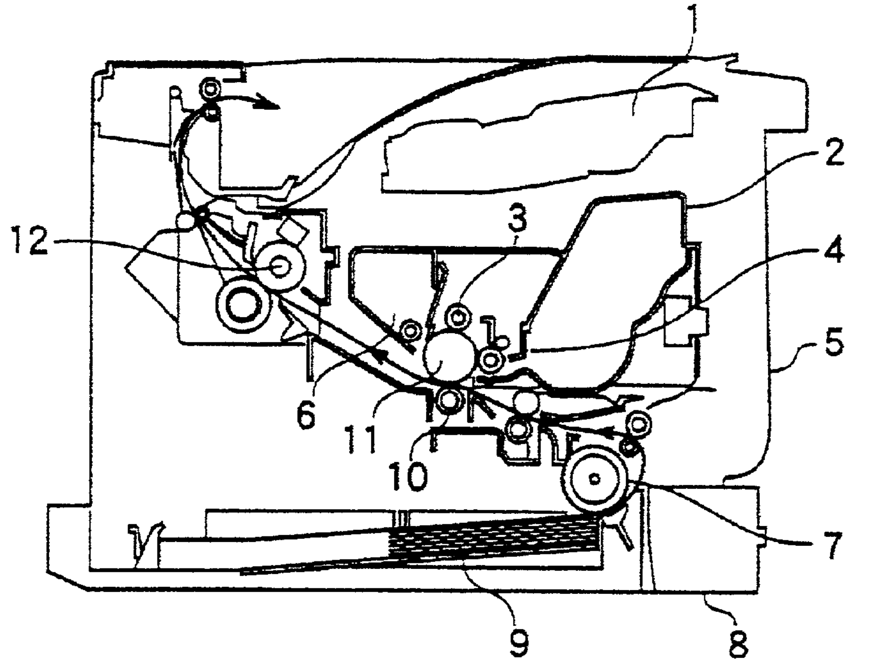
FIG. 1 is a view showing an image forming apparatus embodying the present invention.
Figure 2:
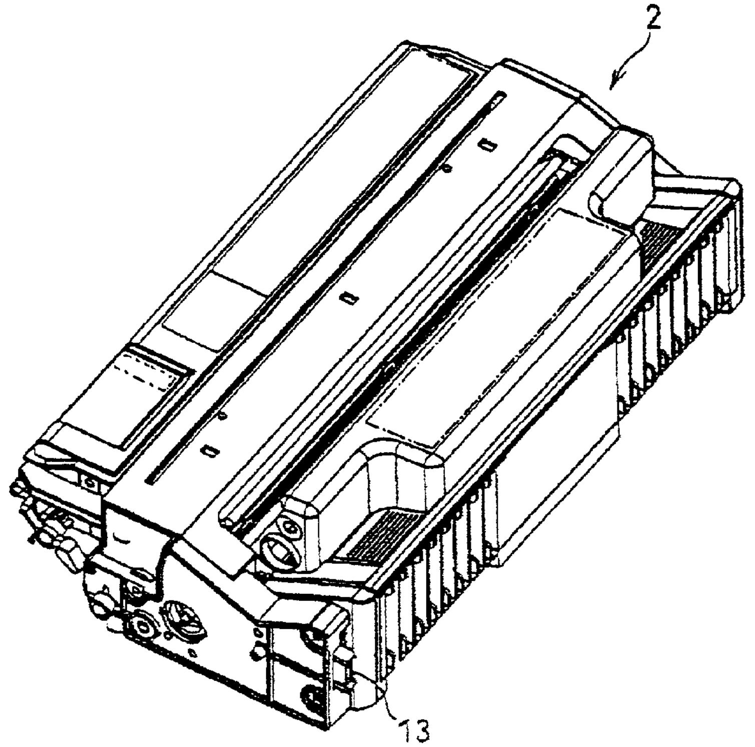
FIG. 2 is a perspective view of a process cartridge removably mounted to the apparatus shown in FIG. 1.

Referring to FIG. 1 of the drawings, an image forming apparatus embodying the present invention is shown and includes a process cartridge 2. The process cartridge is bodily removable from an apparatus body 5. FIG. 2 shows the process cartridge 2 in a perspective view.

As shown in FIG. 1, the process cartridge 2 includes a photoconductive drum 11, a charge roller 3, a waste toner collection chamber 6 accommodating cleaning means, and a toner chamber accommodating developing means. The process cartridge 2 executes a major part of an electrophotographic process. An optical writing unit 1 is arranged in the apparatus body 5 for scanning the drum 11 with a laser beam imagewise. The optical writing unit 1 includes a polygonal mirror, a motor for rotating the polygonal mirror, an F/θ lens, a laser diode, mirrors and so forth, although not shown specifically.

In operation, a pickup roller 7 pays out a sheet from a tray 8 toward the drum 11 in a direction indicated by an arrow in FIG. 1. While the drum 1 is rotated clockwise, as viewed in FIG. 1, the charge roller 3 uniformly charges the surface of the drum 11. The writing unit 1 scans the charged surface of the drum 11 with a laser beam in accordance with image data, thereby forming a latent image on the drum 11. The developing means positioned in the toner chamber 4 deposits its toner on the latent image to thereby form a corresponding toner image. An image transfer roller 10 transfers the toner image from the drum 11 to the sheet 9. The sheet 9 is then conveyed to a fixing roller 12 and has its toner image fixed thereby. The sheet 9 with the fixed toner image is driven out of the apparatus body 5.

As shown in FIG. 2, the process cartridge 2 includes a circuit board, not shown, and a connector 13 connected to the circuit board. An IC chip, not shown, is mounted on the circuit board and includes a readable and writable nonvolatile memory (cartridge memory hereinafter). The cartridge memory stores various kinds of data relating to the process cartridge. The data include dada for managing the limit of use of the process cartridge and updated, as needed. When the process cartridge 2 is mounted to the apparatus body 5, the cartridge memory is connected to a CPU (Central Processing Unit) included in the apparatus body 5 via the connector 13.

Figure 3:
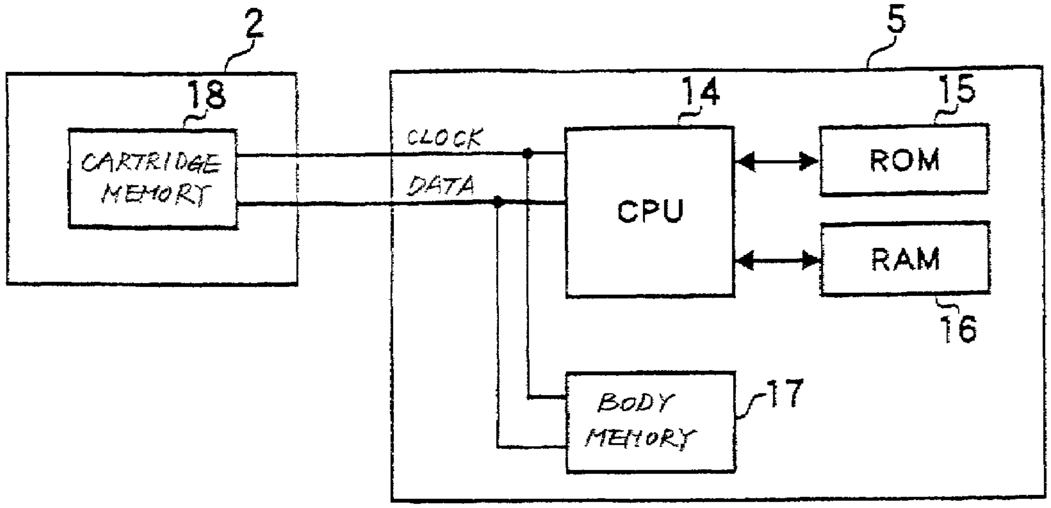
FIG. 3 is a schematic block diagram showing a relation between nonvolatile storing means built in the process cartridge and a controller included in the apparatus body.

FIG. 3 shows a relation between a controller included in the apparatus body 5 and the cartridge memory more specifically. As shown, the cartridge memory, labeled 18, is included in the process cartridge 2. A nonvolatile memory (body memory hereinafter) 17 is mounted on the apparatus body 5. The cartridge memory 18 and body memory 17 each are implemented as an EEPROM (Electrically Erasable Programmable Read Only Memory). The CPU, labeled 14, of the apparatus body 5 controls both of the cartridge memory 18 and body memory 17. A ROM 15 and a RAM 16 are also mounted on the apparatus body 5 and store software and programming data under the control of the CPU 14.

In the illustrative embodiment, the cartridge memory 18 and body memory 17 each are implemented as a particular IC chip (memory chip). The two memories 18 and 17 are connected to the CPU 14 by an $I^2C$ bus. The $I^2C$ bus refers to a double-line serial bus made up of a clock line and a data line for serial communication.

Figure 4:
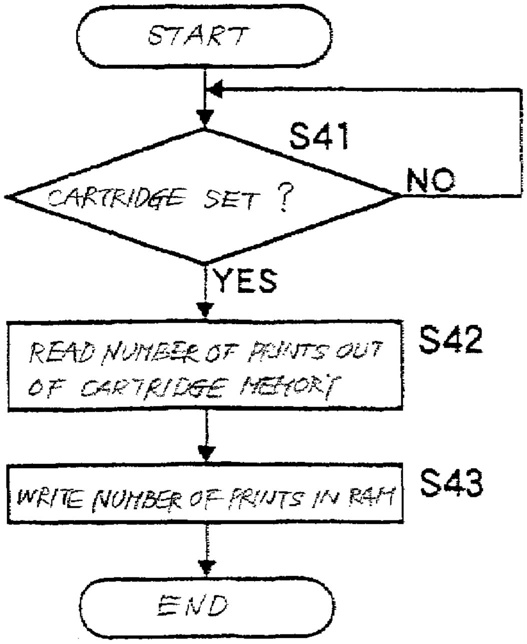
FIG. 4 is a flowchart demonstrating a specific operation of the controller relating to the management of the limit of use of the process cartridge.
Figure 5:
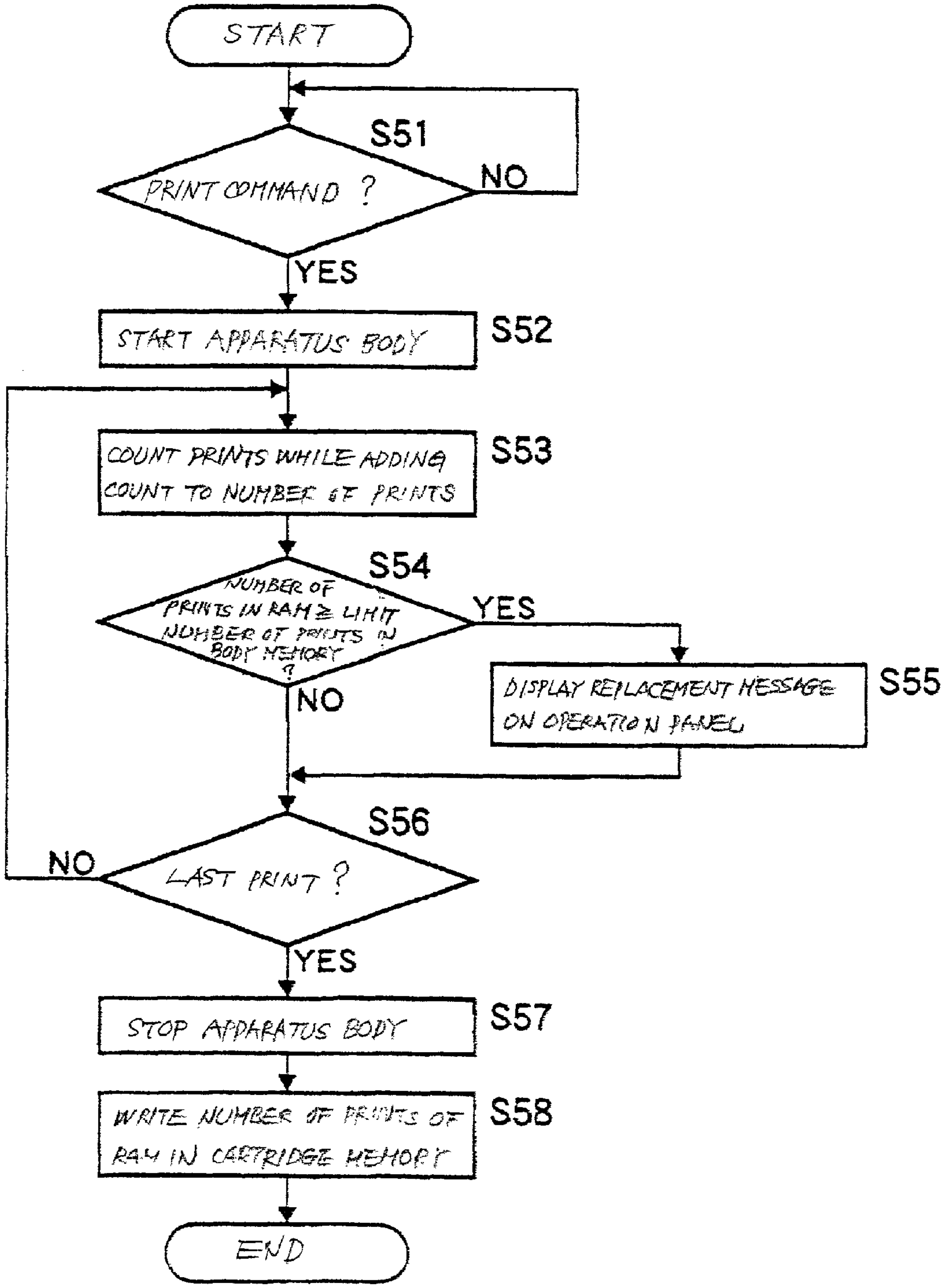
FIG. 5 is a flowchart demonstrating another specific operation of the controller also relating to the management of the limit of use.

Reference will be made to FIGS. 4 and 5 for describing a specific procedure to be executed by the CPU 14 for managing the limit of use of the process cartridge 2. Briefly, when the cumulative number of prints output with the process cartridge 2 reaches a preselected number, the CPU 14 reports the time for replacing the cartridge 2 to the user. The procedure begins when the apparatus body 5 is switched on or a door, not shown, mounted on the apparatus body 5 is opened and then closed for mounting the process cartridge 2.

As shown in FIG. 5, the CPU 14 first determines whether or not the process cartridge 2 is adequately set on the apparatus body 5 (step S41). For this purpose, the CPU 14 determines, e.g., whether or not a set switch is in an ON state or whether or not the IC chip of the process cartridge 2 has been connected to the circuit board of the apparatus body 5 via the connector 13. The CPU 14 then reads the number of prints out of the cartridge memory 18 (step S42) and writes it in the RAM 16 (step S43).

After the sequence of steps shown in FIG. 4, the CPU 14 determines whether or not a print command is input (step S51, FIG. 5). In response to a print command (YES, step S51), the CPU 14 causes the apparatus body 5 to start printing operation (step S52). The CPU 14 adds the number of prints output this time, which is represented by a count signal, to the number of prints stored in the RAM 16 to thereby determine a cumulative number of prints and then updates the number stored in the RAM 16 (step S53). The cumulative number of prints is used as management information. More specifically, a sheet sensor, not shown, is positioned downstream of the fixing roller 12 and senses sheets, or prints, sequentially output from the apparatus body 5 while outputting the count signal mentioned above.

Subsequently, the CPU 14 reads a preselected limit number of prints available with the process cartridge 2 out of the body memory 17. The CPU 14 then determines whether or not the cumulative number of prints stored in the RAM 16 has reached the limit number of prints (step S54). If the answer of the step S54 is YES, then the CPU 14 displays on an operation panel, not shown, a message for urging the user to replace the process cartridge 2 (step S55). After the step S55 or if the answer of the step S54 is negative (NO), the CPU 14 determines whether or not all image data have been printed out, i.e., whether or not the printing operation has ended (step S56). If the answer of the step S56 is NO, then the CPU 14 returns to the step S53 for printing out the remaining image data. If the answer of the step S56 is YES, then the CPU 14 causes the apparatus body 5 to stop operating (step S57) and transfers the current cumulative number of prints stored in the RAM 16 to the cartridge memory 18 (step S58).

The process cartridge 2 reaches its limit of use when the life of the drum 11, charge roller 3 or similar structural element expires, when toner is fully consumed or when the waste toner chamber becomes full. In the illustrative embodiment, when the limit number of prints is used as the limit of use of the process cartridge 2, the number of prints output with the process cartridge 2 is written to the cartridge memory 18. This insures the management of the limit of use of the process cartridge 2 and quality and surely reports the time for replacement to the user.

Figure 7:
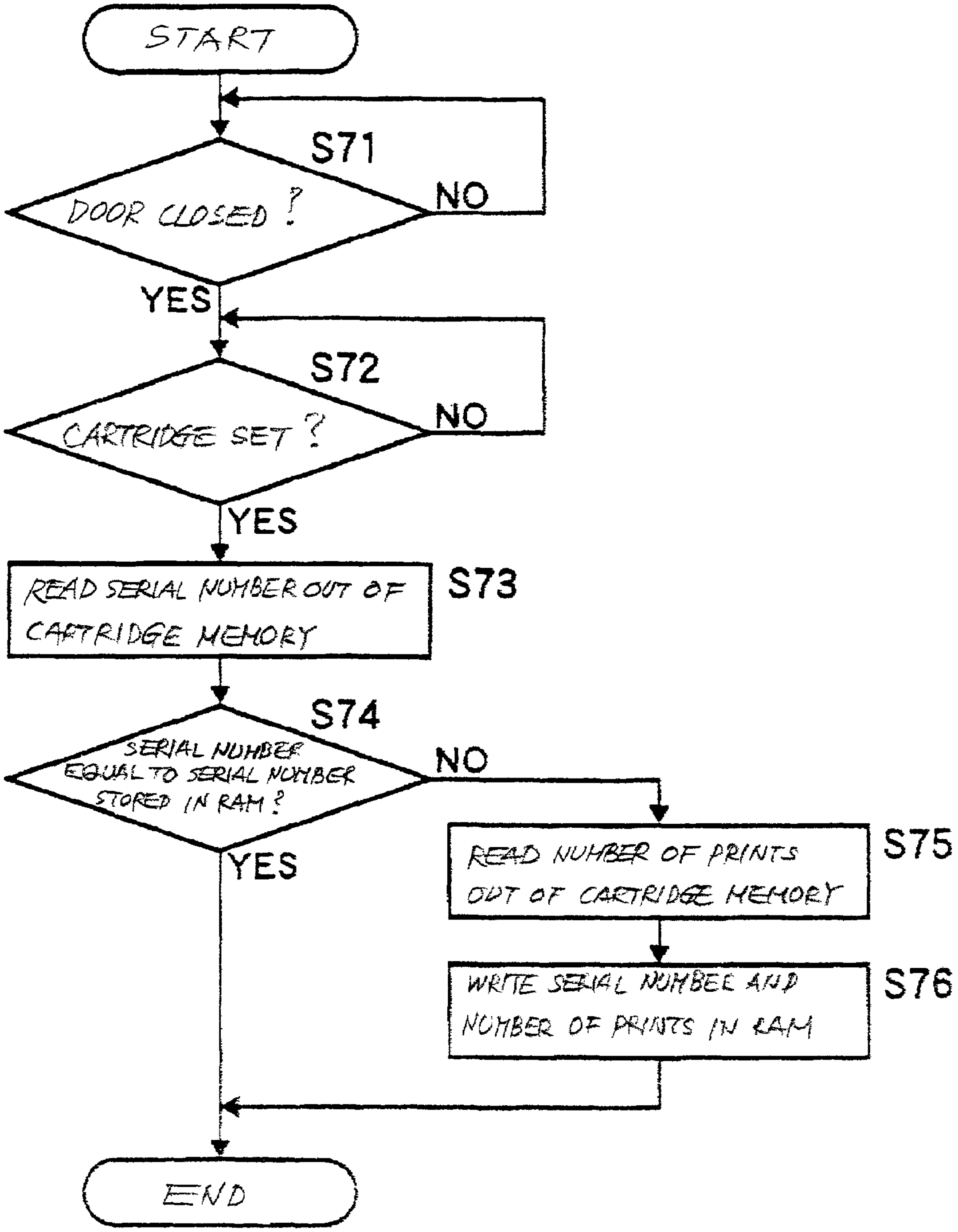
FIG. 7 is a flowchart showing a specific procedure for updating, when the process cartridge is mounted to the apparatus body, information representative of the limit of use and stored in a RAM (Random Access Memory)

FIG. 7 shows another specific procedure to be executed by the CPU 14 for managing the limit of use of the process cartridge 2. The procedure shown in FIG. 7 promotes accurate management when the process cartridge 2 is replaced in the ON state of the apparatus body 5. To replace the process cartridge 2, the door mentioned earlier is necessarily opened and then closed. In light of this, the CPU 14 determines, on detecting the closing of the door, that the process cartridge 2 has been replaced and then updates the management information stored in the RAM 16.

As shown in FIG. 7, the CPU 14 determines whether or not the door is closed (step S71). If the answer of the step S71 is YES, then the CPU 14 determines whether or not the process cartridge 2 is adequately positioned on the apparatus body 5 as in the step S41 of FIG. 4 (step S72). If the answer of the step S72 is YES, then the CPU 14 reads a serial number particular to the process cartridge 2 and stored in the cartridge memory 18 (step S73). Subsequently, the CPU 14 compares the serial number and a serial number stored in the RAM 16 to see if the former is identical with the latter (step S74). If the answer of the step S74 is YES, then the CPU 14 ends the procedure. If the answer of the step S74 is NO, meaning that the process cartridge 2 has been replaced, then the CPU 14 reads the number of prints out of the cartridge memory 18 and writes it in the RAM 16 together with the serial number read out in the step S73 (step S76).

As stated above, the procedure shown in FIG. 7 determines whether or not the process cartridge 2 has been replaced by comparing serial numbers. It is therefore possible to omit wasteful data updating when the process cartridge 2 is not replaced or to surely update data when it is replaced. This promotes rapid, adequate management of the limit of use of the process cartridge 2.

Another specific procedure relating to the management of the limit of use of the process cartridge will be described with reference to FIG. 14. The procedure to be described, like the procedure of FIG. 7, promotes accurate management of the limit of use when the process cartridge 2 is replaced. A difference is that while the procedure of FIG. 7 using the RAM 16 looses data when the apparatus body 5 is switched off, the procedure of FIG. 14 can cope with even the replacement of the process cartridge 2 performed in the OFF state of the apparatus body 5.

Figure 14:
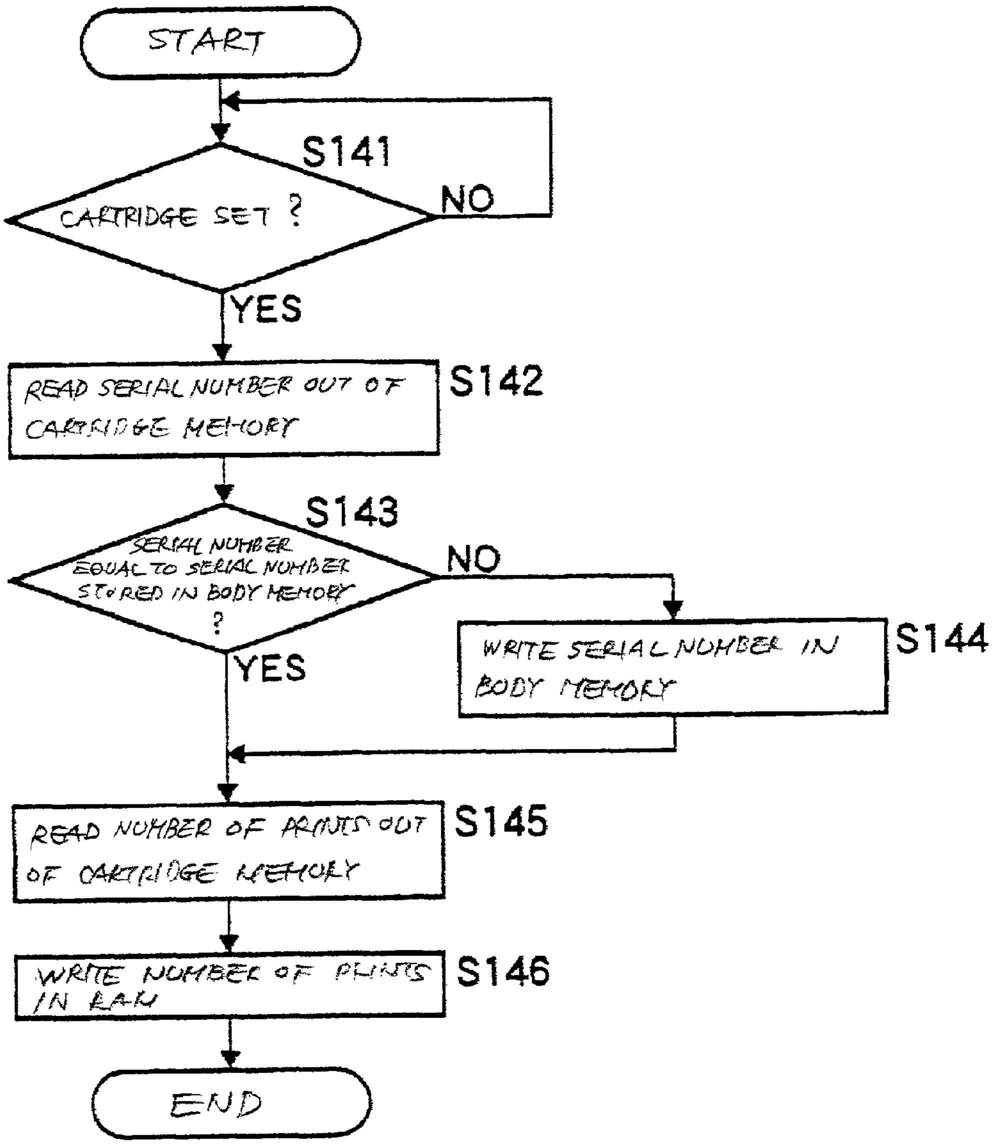
FIG. 14 is a flowchart showing another specific procedure for updating, when the process cartridge is mounted to the apparatus body, information representative of the limit of use and stored in the RAM and storing means of the apparatus body.

Briefly, in the procedure FIG. 14, the CPU 14 writes the serial number of the process cartridge 2 in the body memory 17. When the apparatus body 5 is switched on and if the process cartridge 2 has been replaced, the CPU 14 writes correct management information in the body memory 17 and RAM 16.

Specifically, as shown in FIG. 14, when the apparatus body 5 is switched on, the CPU 14 determines whether or not the process cartridge 2 is adequately set on the apparatus body 5 with the previously stated scheme (step S141). If the answer of the step S141 is YES, the CPU 14 reads a serial number particular to the process cartridge 2 out of the cartridge memory 18 (step S142). The CPU 14 then compares the serial number with a serial number stored in the body memory 17 to see if the former is identical with the latter (step S143). If the answer of the step S143 is NO, meaning that the process cartridge 2 has been replaced, then the CPU 14 writes the serial number read out of the cartridge memory 18 in the body memory 17 (step S144). Subsequently, the CPU 14 reads the number of prints out of the cartridge memory 18 (step S145) and writes it in the RAM 16 as usual (step S146).

As stated above, the above procedure writes the serial number of the process cartridge 2 in the nonvolatile body memory 17 and can therefore determine the replacement of the cartridge 2 even when the apparatus body 5 is in an OFF state. This surely updates the data and thereby promotes rapid, adequate management of the limit of use.

The procedure described above with reference to FIG. 14 has concentrated on the OFF state of the apparatus body 5. Hereinafter will be described a decision on the replacement of the process cartridge to be made in the ON state of the apparatus body 5 with reference to FIG. 8. The process cartridge 2 is mounted by opening and then closing the door of the apparatus body 5, as stated earlier. The procedure to be described makes the above decision when the door is closed and writes, if the process cartridge 2 is replaced, correct information in the body memory 17 and RAM 16 as management information.

Figure 8:
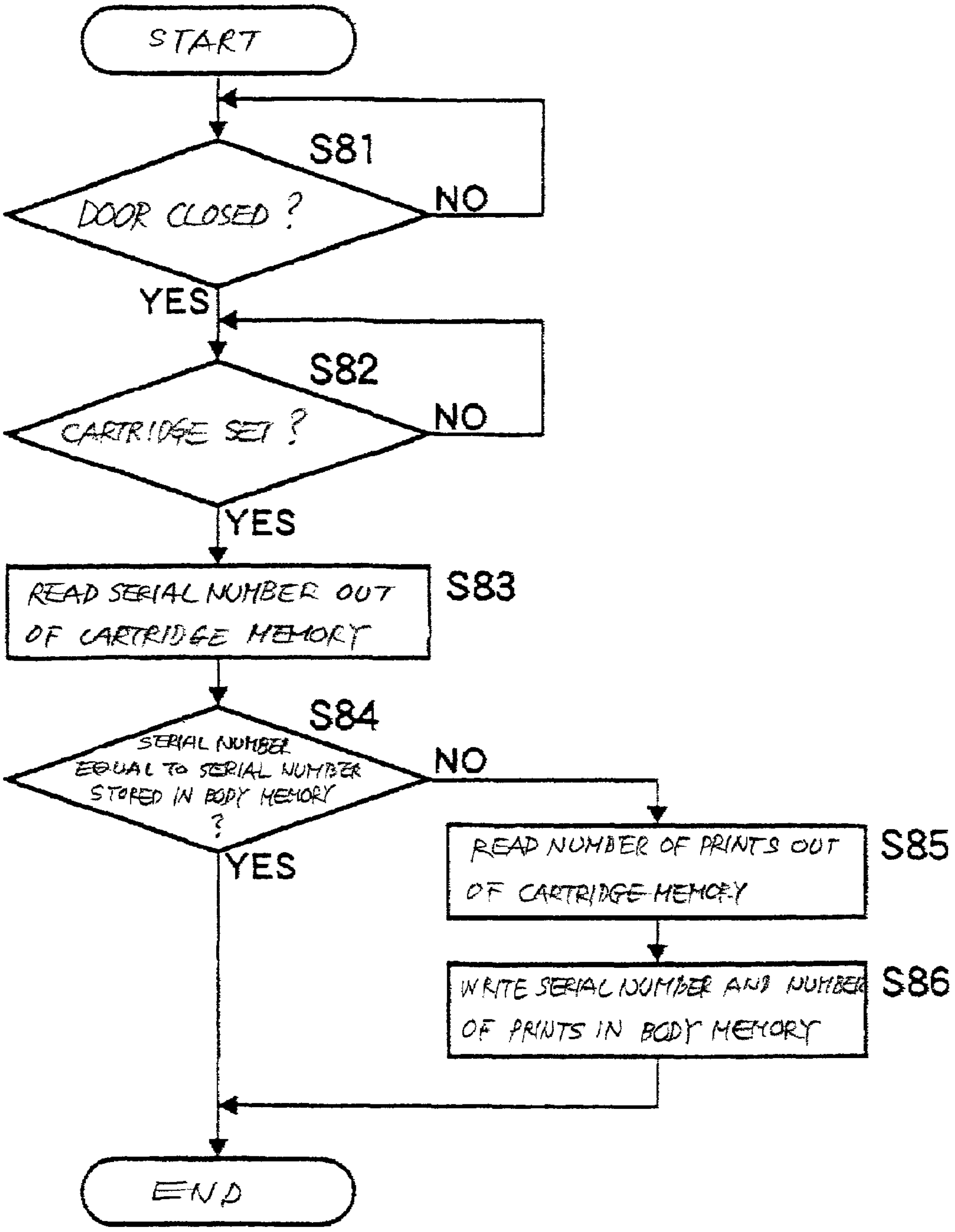
FIG. 8 is a flowchart showing a specific procedure for updating, when the process cartridge is mounted to the apparatus body, information representative of the limit of use and stored in the RAM and storing means of the apparatus body.

Specifically, as shown in FIG. 8, the CPU 14 determines whether or not the door is closed (step S81). If the answer of the step S81 is YES, then the CPU 14 determines whether or not the process cartridge 2 is adequately set on the apparatus body 5 with the previously stated scheme (step S82). If the answer of the step S82 is YES, then the CPU 14 reads a serial number out of the cartridge memory 18 of the process cartridge 2 (step S83). Subsequently, the CPU 14 determines whether or not the above serial number is identical with a serial number stored in the body memory 17 (step S84). If the answer of the step S84 is YES, then the CPU 14 ends the procedure. If the answer of the step S84 is NO, meaning that the process cartridge 2 has been replaced, then the CPU 14 reads a serial number and the number of prints out of the cartridge memory 18 (step S85). The CPU 14 writes the number of prints in the RAM 16 and body memory 17 (step S86).

The procedure of FIG. 8 also achieves the same advantage as the previously stated procedure. In the illustrative embodiment, in the ON state of the apparatus body 5, the CPU 14 compares a serial number read out of the cartridge memory 18 with a serial number stored in the body memory 17 as in the procedure of FIG. 8. If the two serial numbers do not compare equal, then the CPU 14 reads the number of prints out of the cartridge memory 18 and writes it in the RAM 16 while updating the number of prints stored in the body memory 17. If the two serial numbers compare equal, then the CPU 14 executes the procedure shown in FIG. 4.

The limit number of prints used in the specific procedures will be described more specifically hereinafter. Today, the life of structural elements constituting a process cartridge is extending, and many of them are recyclable. By contrast, the limit of use of toner and that of waste toner are noticeably dependent on the sheet size and image ratio. While the toner chamber 4 and waste toner collection chamber 6 may be increased in size to extend the life of the process cartridge, the resulting process cartridge is bulky and expensive. It is therefore a common practice to design a cartridge by assuming general conditions of use and determining the size of the toner chamber 4 and that of the waste toner collection chamber 6 with some margins. The number of prints that will not cause waste toner to overflow the waste toner collection chamber 6 is selected to be the limit number of prints.

As far as general conditions of use are concerned, toner is fully consumed before a message for replacement is displayed due to the limit number of prints. However, images with an extremely small image ratio are sometimes continuously printed, depending on the kind of work. In such a case, the cartridge reaches the limit number of prints despite that much toner is still available. If the amount of waste toner is great, then it is possible to adequately determine the limit of use. However, if the amount of waste toner is small, then it is desirable to intentionally extend the limit of use. Conversely, if the condition of use is likely to cause waste toner to overflow, it is desirable to quicken the limit of use. A specific procedure adaptive to such a condition of use, which depends on the user, will be described with reference to FIG. 6.

Figure 6:
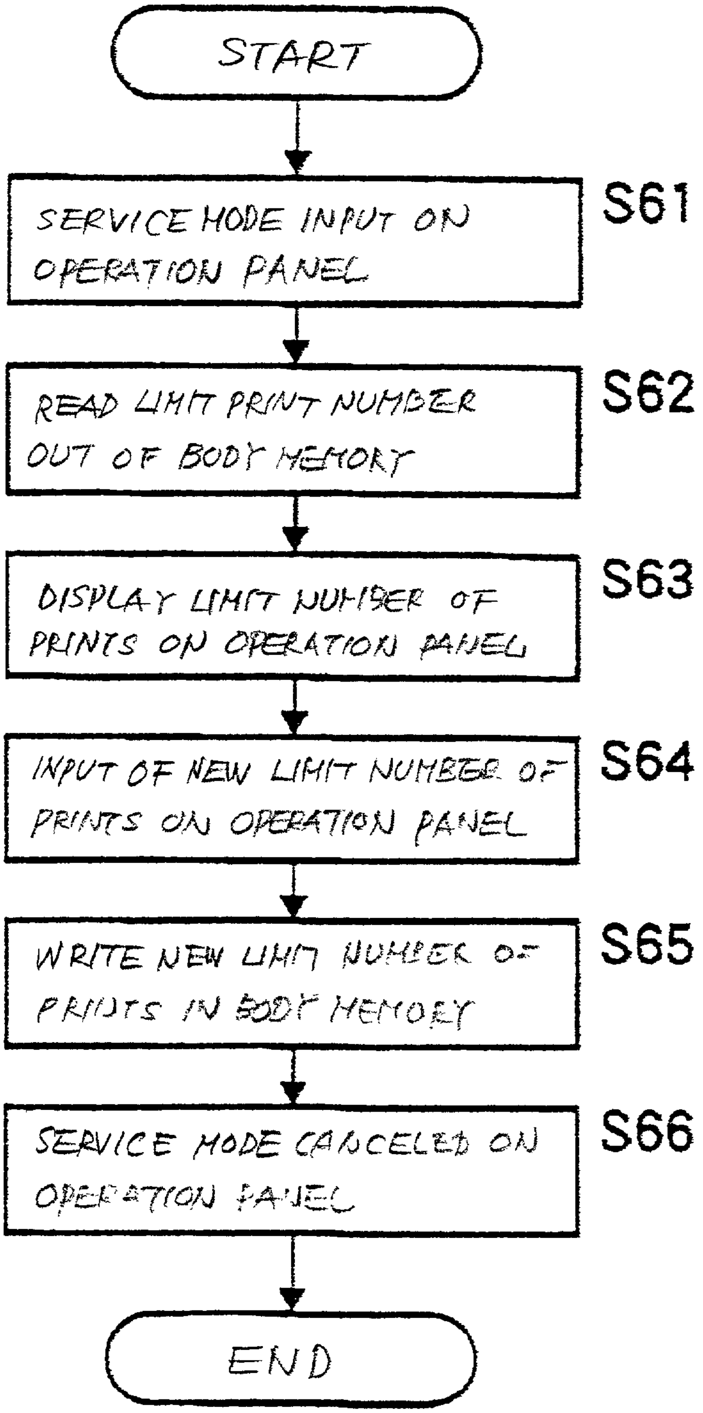
FIG. 6 is a flowchart showing a specific procedure relating to a limit number of prints used in the operation of FIG. 5.

As shown in FIG. 6, when a service engineer inputs a service command on the operation panel, the CPU 14 sets up a service mode (step S61). The CPU 14 reads the limit number of prints out of the body memory 17 in response to a command input on the operation panel (step S62) and displays the limit number of prints on a display, not shown, mounted on the operation panel (step S63). Watching the display, the service engineer inputs a particular limit number of prints corresponding to an adequate limit of use on the operation panel (step S64). The CPU 14 writes the limit number of prints input in the body memory 17 to thereby update the set value (step S65). Thereafter, the service engineer cancels the service mode on the operation panel (step S66).

As stated above, the procedure of FIG. 6 allows the limit number of prints, i.e., the limit of use of the process cartridge 2 to be varied to the user's taste. This promotes more adequate management of the limit of use.

Figure 9:
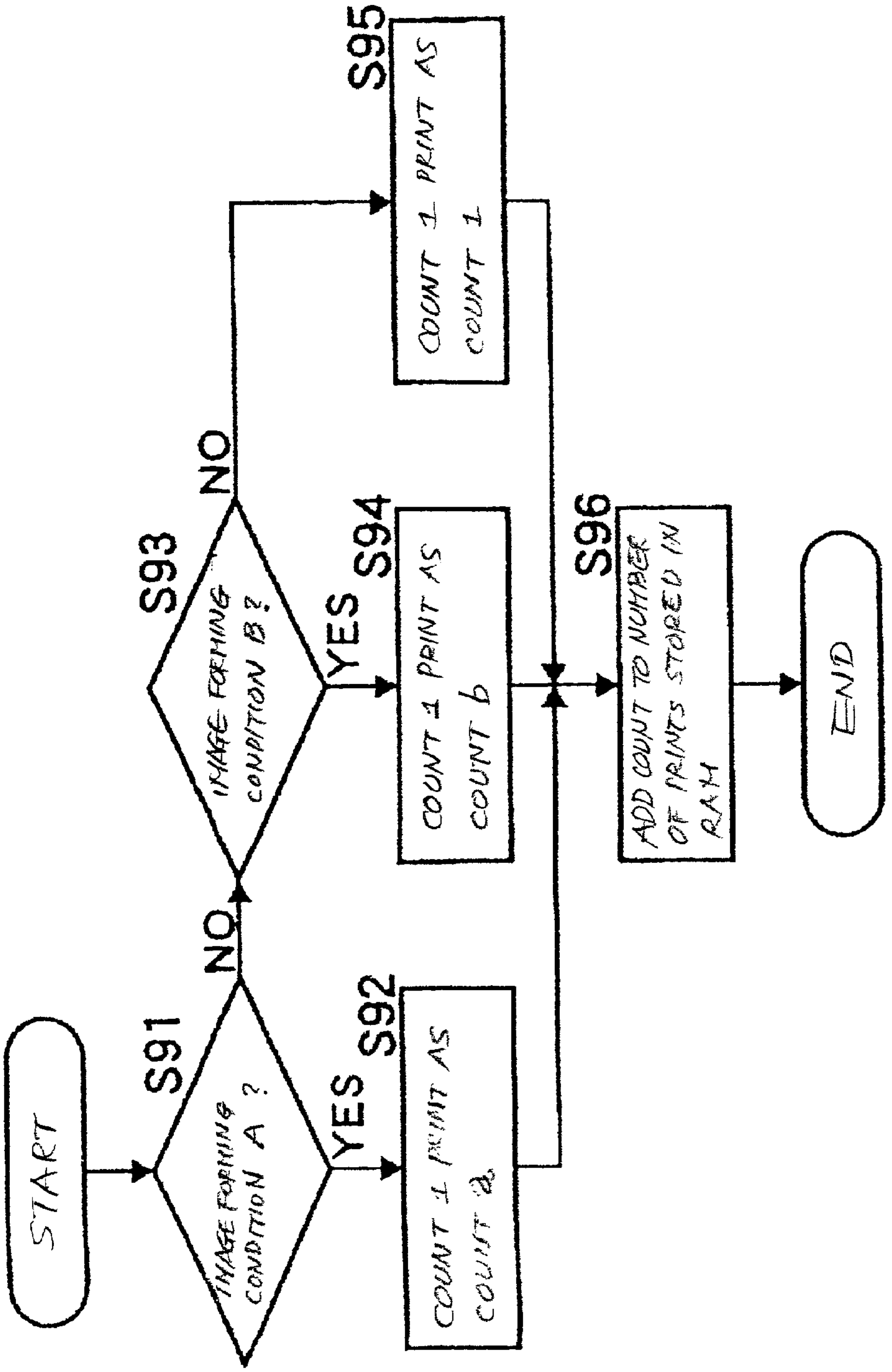
FIG. 9 is a flowchart showing a procedure for determining the cumulative number of prints and using values corrected in accordance with the image forming condition.

FIG. 9 shows a specific procedure relating to the cumulative number of prints. The procedure to be described corrects, based on an image forming condition, the cumulative number of prints determined in the procedure of FIGS. 3 and 4 for managing the limit of use of the process cartridge 2. This successfully obviates the influence of a difference in image forming condition for a given limit number of prints, thereby insuring the management of the limit of use of the process cartridge 2. In the following specific procedure, a count usually representative of a single print is replaced with a count corrected in accordance with the image forming condition.

Specifically, as shown in FIG. 9, the CPU 14 first checks an image forming condition set in order to select a corrected value. More specifically, the CPU 14 determines an image forming condition set that is an image forming condition A or B or any other image forming condition (steps S91 and S93). If the image forming condition A is set (YES, step S91), then the CPU 14 substitutes a count a for the count of a single print (step S92). Likewise, if the image forming condition B is set (YES, step S93), the CPU 14 substitutes a count b for the count of a single print (step S94). If the answer of the step S93 is NO, then the CPU 14 counts a single print as one, determining that a usual printing condition other than A and B is set (step S95). Each time of printing, the CPU 14 adds the count (step S92, S94 or S95) to the cumulative number of prints stored in the RAM 16 to thereby update the cumulative number (step S96). The CPU 14 then ends the procedure. In this manner, the procedure of FIG. 9 accurately manages the limit of use of the process cartridge 2 by correcting the count in accordance with the image forming condition.

Image density is one of image forming conditions relating to the limit of use of the process cartridge 2. More specifically, raising or lowering image density means controlling the amount of toner to deposit on the drum 11 and therefore relates to the amount of toner consumption and that of waste toner. In light of this, the count of prints output is corrected in accordance with image density set. For example, when image density is raised, the CPU 14 determines that the image forming condition A, FIG. 9, is selected and counts a single print as a 1.1 print (count a). When image density is lowered, the CPU 14 determines that the image forming condition B is selected and counts a single print as a 0.9 print (count b). This promotes accurate management of the limit of use of the process cartridge 2.

A toner save mode is another image forming condition relating to the limit of use of the process cartridge 2. A toner save mode is used for a resource and energy saving purpose when the amount of toner to form an image may be reduced. It is a common practice with this mode to reduce image data and therefore the amount of toner to deposit on the drum 11. The toner save mode is available in a plurality of steps with some image forming apparatuses. It follows that the toner save mode differs from the usual mode in the amount of toner consumption and that of waste toner. In light of this, the CPU 14 may assign a 0.9 count (count a) to a light toner save mode (image forming condition A) and assign a 0.8 count (count b) to a heavy toner save mode (image forming condition B). This also promotes accurate management of the limit of use of the process cartridge 2.

Figure 10:
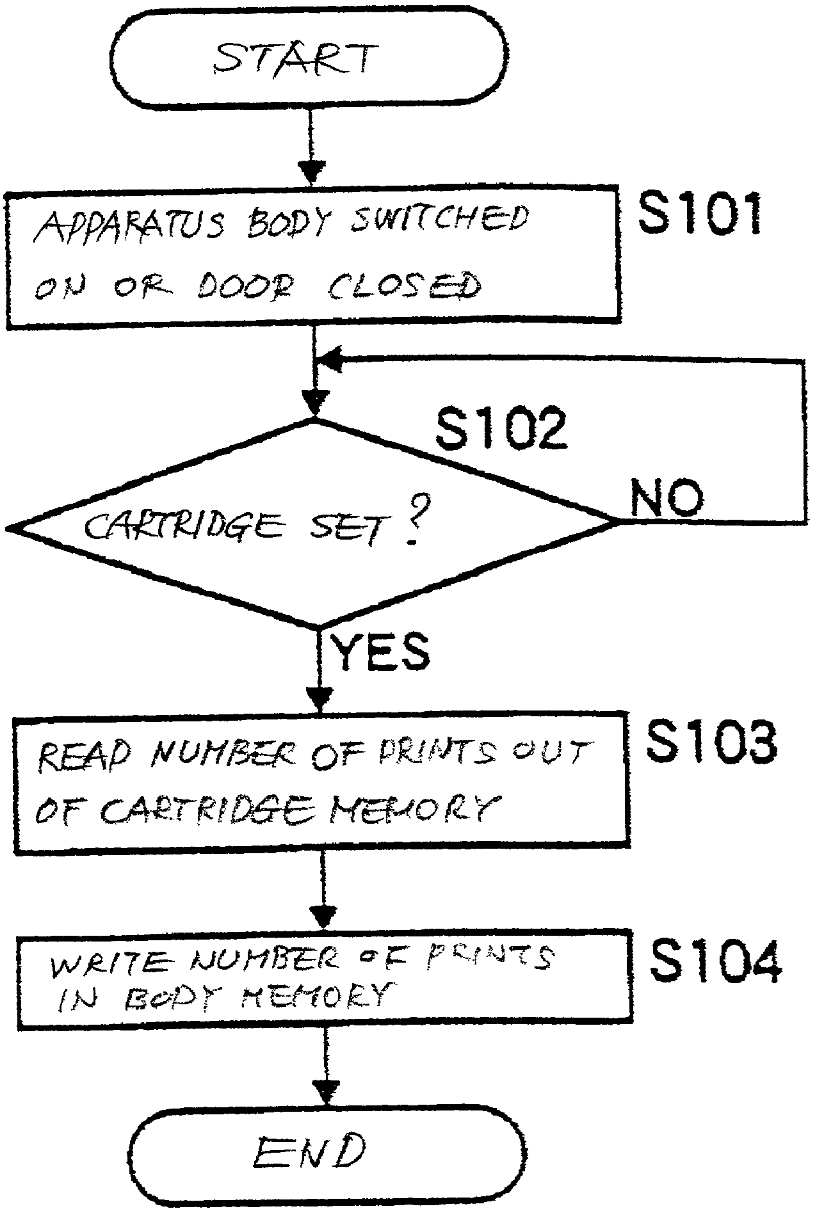
FIG. 10 is a flowchart demonstrating another specific operation of the controller relating to the management of the limit of use of the process cartridge.
Figure 11:
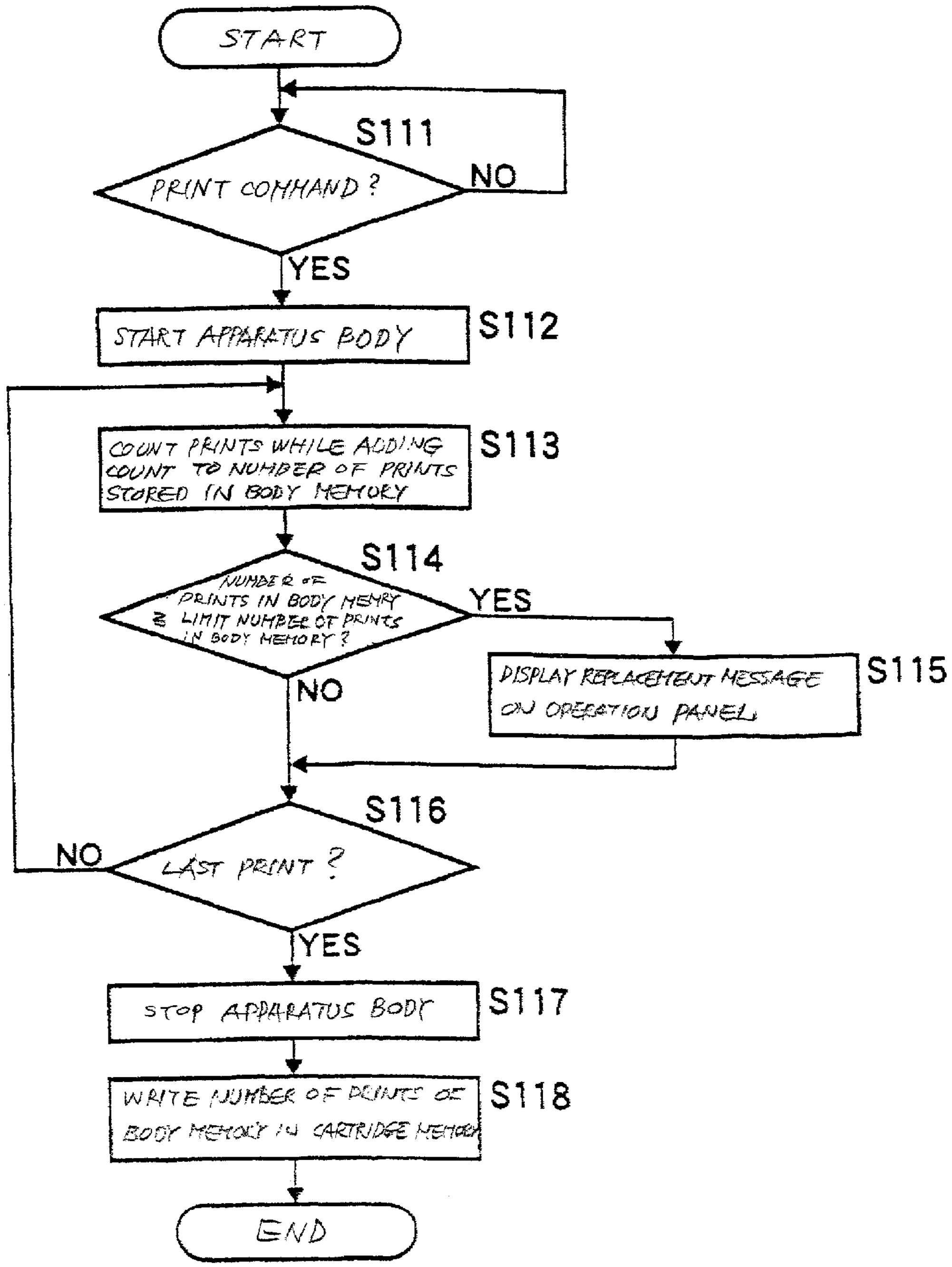
FIG. 11 is a flowchart demonstrating another specific operation of the controller also relating to the management of the limit of use.

FIGS. 10 and 11 show another specific procedure relating to the management of the limit of use of the process cartridge 2. The procedure to be described also reports the time for replacement to the user when the number of prints output with the process cartridge 2 reaches the preselected limit number of prints. This procedure is characterized in that the body memory 17 manages the cumulative number of prints read out of the cartridge memory 18 when the process cartridge 2 is mounted to the apparatus body 5, thereby coping with unexpected power shut-off.

As shown in FIG. 10, the CPU 14 starts the procedure when the apparatus body 5 is switched on or when the door is closed after the mounting of the process cartridge 2 (step S101). The CPU 14 then determines whether or not the process cartridge 2 is accurately set on the apparatus body 5 with the previously stated scheme (step S102). If the answer of the step S102 is YES, then the CPU 14 reads the number of prints out of the cartridge memory 18 (step S103), writes it in the body memory 17 (step S104), and then ends the procedure.

After the step S104, FIG. 10, the CPU 14 waits for a print command (step S111, FIG. 11). In response to a print command (YES, step S111), the CPU 14 first causes the apparatus body 5 to start printing operation (step S112). During printing operation, the CPU 14 adds the number of prints output this time, which is represented by a count signal, to the number of prints stored in the body memory 17 to thereby determine a cumulative number of prints and then updates the number stored in the body memory 17 (step S113). The cumulative number of prints is used as management information. Again, the sheet sensor positioned downstream of the fixing roller 12 senses sheets, or prints, sequentially output from the apparatus body 5 while outputting the count signal mentioned above.

Subsequently, the CPU 14 reads a preselected limit number of prints available with the process cartridge 2 out of the body memory 17. The CPU 14 then determines whether or not the cumulative number of prints stored in the body memory 17 has reached the limit number of prints (step S114). If the answer of the step S114 is YES, then the CPU 14 displays on the operation panel a message for urging the user to replace the process cartridge 2 (step S115). After the step S115 or if the answer of the step S115 is negative (NO), the CPU 14 determines whether or not all image data have been printed out, i.e., whether or not the printing operation has ended (step S116). If the answer of the step S116 is NO, then the CPU 14 returns to the step S113 for printing out the remaining image data. If the answer of the step S116 is YES, then the CPU 14 causes the apparatus body 5 to stop operating (step S117) and transfers the current cumulative number of prints stored in the body memory 17 to the cartridge memory 18 (step S118).

Again, the process cartridge 2 reaches its limit of use when the life of the drum 11, charge roller 3 or similar structural element expires, when toner is fully consumed or when the waste toner chamber becomes full. In the above specific procedure, too, when the limit number of prints is used as the limit of use of the process cartridge 2, the number of prints output with the process cartridge 2 is written to the cartridge memory 18. This insures the management of the limit of use of the process cartridge 2 and quality and surely reports the time for replacement to the user.

Figure 12:
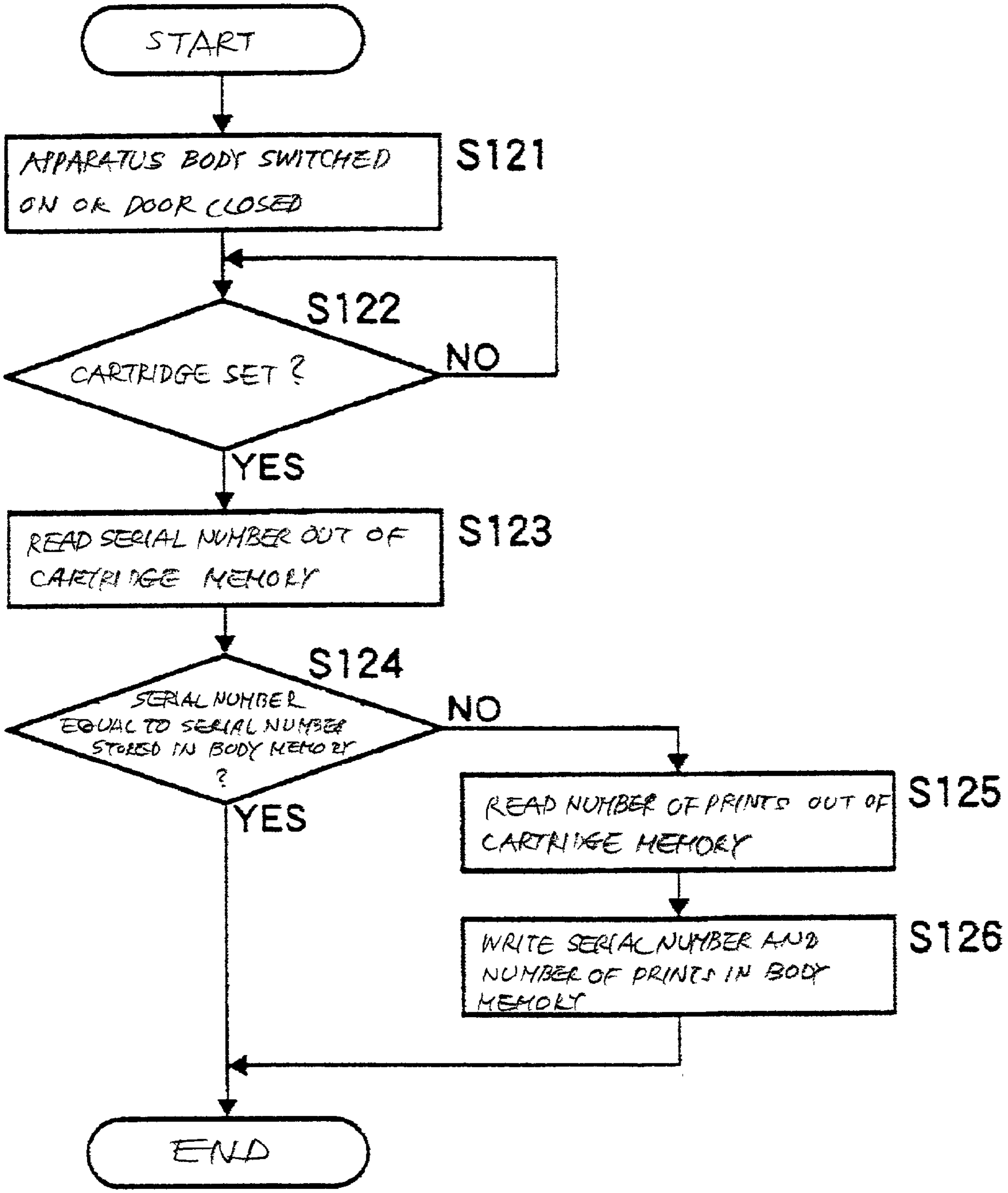
FIG. 12 is a flowchart demonstrating showing a specific procedure for updating, when the process cartridge is mounted to the apparatus body, information representative of the limit of use and stored in the storing means of the apparatus body.

Another procedure, which is an alternative to the procedure of FIGS. 10 and 11, will be described with reference to FIG. 12. This procedure determines whether or not the process cartridge 2 has been replaced and manages, if it has been replaced, the limit of use of a new cartridge with accuracy, i.e., writes correct information in the body memory 17.

Specifically, the process cartridge 2 may be replaced by opening and closing the door or in the OFF state of the apparatus body 5. In light of this, as shown in FIG. 12, the CPU 14 determines whether or not the door is closed (step S121). If the answer of the step S121 is YES, then the CPU 14 determines whether or not the process cartridge 2 is adequately set on the apparatus body 5 with the previously stated scheme (step S122). If the answer of the step S122 is YES, then the CPU 14 reads a serial number out of the cartridge memory 18 of the process cartridge 2 (step S123). Subsequently, the CPU 14 determines whether or not the above serial number is identical with a serial number stored in the body memory 17 (step S124). If the answer of the step S124 is YES, then the CPU 14 ends the procedure. If the answer of the step S124 is NO, meaning that the process cartridge 2 has been replaced, then the CPU 14 reads a serial number and the number of prints out of the cartridge memory 18 of a new process cartridge (step S125). The CPU 14 writes the serial number and number of prints in the body memory 17 (step S126).

As stated above, at a time when the process cartridge 2 may be replaced, the CPU 14 compares a serial number read out of the cartridge memory 18 with a serial number stored in the body memory 17. If the two serial numbers compare equal, then the CPU 14 omits wasteful data updating. If the serial numbers do not compare equal, meaning that the process cartridge 2 has been replaced, the CPU 14 surely updates data.

The limit number of prints used in the specific procedure of FIGS. 10 and 11 will be described more specifically hereinafter. Today, the life of structural elements constituting a process cartridge is extending, and many of them are recyclable, as stated earlier. By contrast, the limit of use of toner and that of waste toner are noticeably dependent on the sheet size and image ratio. While the toner chamber 4 and waste toner collection chamber 6 may be increased in size to extend the life of the process cartridge, the resulting process cartridge is bulky and expensive. It is therefore a common practice to design a cartridge by assuming general conditions of use and determining the size of the toner chamber 4 and that of the waste toner collection chamber 6 with some margins. The number of prints that will not cause waste toner to overflow the waste toner collection chamber 6 is selected to be the limit number of prints.

A specific procedure relating to the limit number of prints of FIGS. 10 and 11 will be described hereinafter. This procedure is identical with the procedure described with reference to FIG. 6. Specifically, when a service engineer inputs a service command on the operation panel, the CPU 14 sets up a service mode (step S61). The CPU 14 reads the limit number of prints out of the body memory 17 in response to a command input on the operation panel (step S62) and displays the limit number of prints on the display mounted on the operation panel (step S63). Watching the display, the service engineer inputs a particular limit number of prints corresponding to an adequate limit of use on the operation panel (step S64) The CPU 14 writes the limit number of prints input in the body memory 17 to thereby update the set value (step S65). Thereafter, the service engineer cancels the service mode on the operation panel (step S66).

Again, the procedure described above allows the limit number of prints, i.e., the limit of use of the process cartridge 2 to be varied to the user's taste. This promotes more adequate management of the limit of use.

Figure 13:
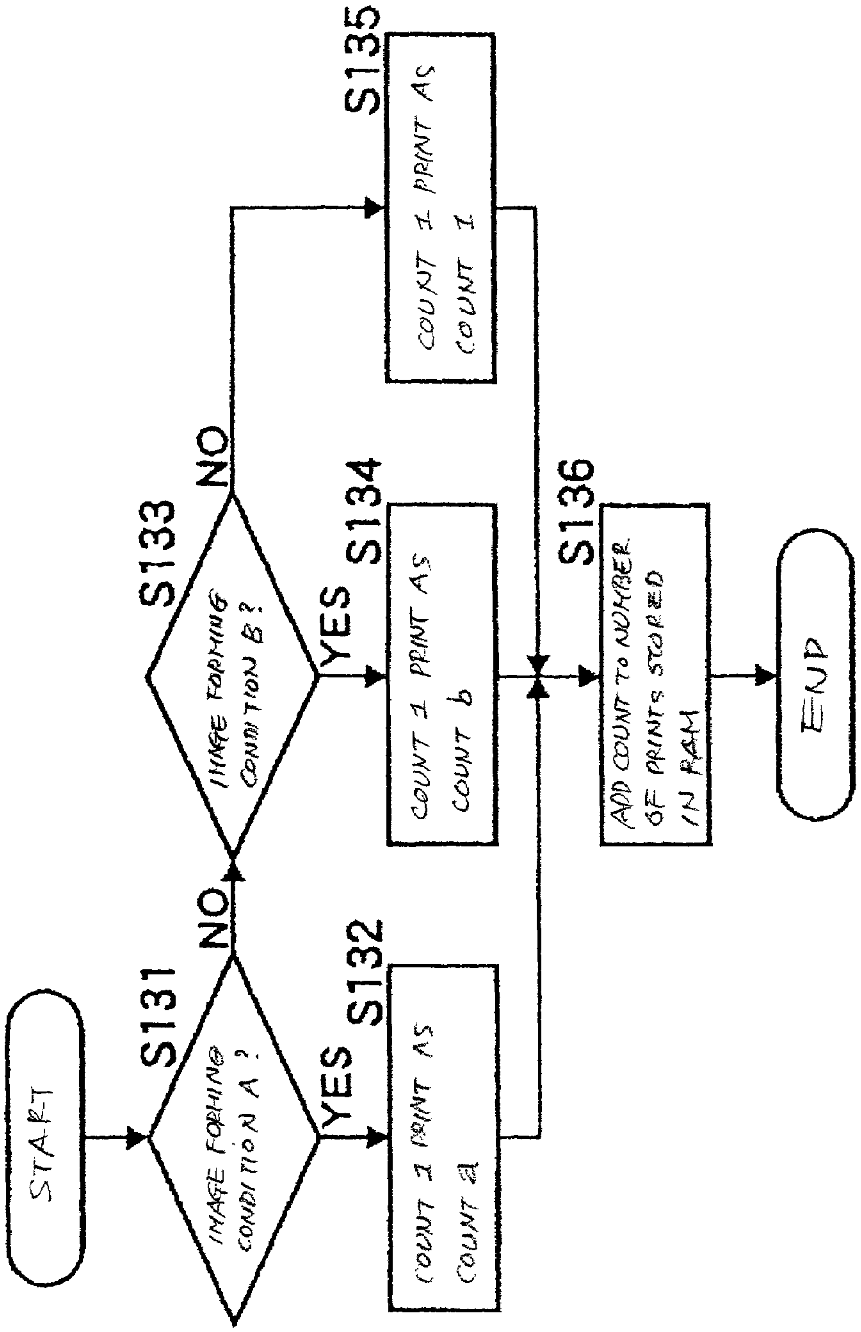
FIG. 13 is a flowchart showing another procedure for determining the cumulative number of prints and using values corrected in accordance with the image forming condition.

FIG. 13 shows a specific procedure relating to the cumulative number of prints. The procedure to be described corrects, based on an image forming condition, the cumulative number of prints determined in the procedure of FIGS. 10 and 11 for managing the limit of use of the process cartridge 2. This successfully obviates the influence of a difference in image forming condition for a given limit number of prints, thereby insuring the management of the limit of use of the process cartridge 2. In the following specific procedure, a count usually representative of a single print is replaced with a count corrected in accordance with the image forming condition.

Specifically, as shown in FIG. 13, the CPU 14 first checks an image forming condition set in order to select a corrected value. More specifically, the CPU 14 determines an image forming condition set that is an image forming condition A or B or any other image forming condition (steps S131 and S133). If the image forming condition A is set (YES, step S131), then the CPU 14 substitutes a count a for the count of a single print (step S132). Likewise, if the image forming condition B is set (YES, step S93), the CPU 14 substitutes a count b for the count of a single print (step S134). If the answer of the step S133 is NO, then the CPU 14 counts a single print as a single print, determining that a usual printing condition other than A and B is set (step S135). Each time of printing, the CPU 14 adds the count (step S132, S134 or S135) to the cumulative number of prints stored in the RAM 16 to thereby update the cumulative number (step S136). The CPU 14 then ends the procedure. In this manner, the procedure of FIG. 13 accurately manages the limit of use of the process cartridge 2 by correcting the count in accordance with the image forming condition.

Again, image density is one of image forming conditions relating to the limit of use of the process cartridge 2. More specifically, raising or lowering image density means controlling the amount of toner to deposit on the drum 11 and therefore relates to the amount of toner consumption and that of waste toner. In light of this, the count of prints output is corrected in accordance with image density set. For example, when image density is raised, the CPU 14 determines that the image forming condition A, FIG. 13, is selected and counts a single print as a 1.1 print (count a). When image density is lowered, the CPU 14 determines that the image forming condition B is selected and counts a single print as a 0.9 print (count b). This promotes accurate management of the limit of use of the process cartridge 2.

A toner save mode is another image forming condition relating to the limit of use of the process cartridge 2, as stated earlier. It is a common practice with this mode to reduce image data and therefore the amount of toner to deposit on the drum 11. The toner save mode is available in a plurality of steps with some image forming apparatuses. It follows that the toner save mode differs from the usual mode in the amount of toner consumption and that of waste toner. In light of this, the CPU 14 may assign a 0.9 count (count a) to a light toner save mode (image forming condition A) and assign a 0.8 count (count b) to a heavy toner save mode (image forming condition B). This also promotes accurate management of the limit of use of the process cartridge 2.

The illustrative embodiment has concentrated on a replaceable part (cartridge) including a photoconductive drum, a charge roller, toner and so forth for an electrophotographic process, and a procedure relating to the conditions of use of the toner. The replaceable part may alternatively be implemented as a toner cartridge (toner bottle), photoconductive drum unit or similar single part, if desired. Further, the illustrative embodiment is applicable even to an ink jet type of image forming apparatus, in which case the replaceable part will be implemented as an ink cartridge.

In summary, in accordance with the present invention, an image forming apparatus is capable of executing rapid processing, adequately managing cartridges or replaceable parts, and prevents a cartridge memory size from increasing. This is also true with a case wherein a cartridge is replaced when the apparatus or storing means thereof is in operation or when the apparatus is switched off. The apparatus holds the cumulative number of prints even at the time of unexpected power shut-off. The apparatus of the present invention allow the limit number of prints to be set user by user and thereby manages the limit of use of the cartridge more accurately.

Further, the apparatus of the present invention includes effective means for correcting a count sequentially incremented in accordance with the repeated image formation. Moreover, the apparatus of the present invention allows each user to manage the amount of use of the apparatus when an IC chip is mounted, and promotes accurate management of the amount of use and the limit of use of the individual part.

Various modifications will become possible for those skilled in the art after receiving the teachings of the present disclosure without departing from the scope thereof.

What is claimed is:

1. An image forming apparatus comprising:

an apparatus body;

image forming means at least partly implemented by a replaceable part, which is removably mounted to said apparatus body;

counting means for counting prints sequentially output with the replaceable part;

storing means and first writable and readable nonvolatile storing means built in said apparatus body;

second writable and readable nonvolatile storing means built in the replaceable part; and a controller configured to store a limit number of prints particular to the replaceable part in said first nonvolatile storing means, to store, after an image forming operation, a cumulative number of prints printed by said replaceable part in said first nonvolatile storing means at least until the replaceable part is replaced with a different replaceable part and in said second nonvolatile storing means, and to report a time for replacing said replaceable part when said cumulative number stored in said first nonvolatile storing means exceeds said limit number of prints stored in said first nonvolatile storing means, wherein the controller is configured to determine an image forming condition setting and to increment a cumulative number stored in memory in the apparatus body by a number other than one for each of the prints sequentially output with the replaceable part while the image forming condition setting is set to a first of at least two available image forming condition settings.

2. The apparatus as claimed in claim 1, wherein said stores ID (identification) information of an individual replaceable part in said second nonvolatile storing means, transfers said ID information to said storing means when said replaceable part is used, reads said ID information out of said second nonvolatile storing means when said replaceable part is mounted to said apparatus body, and updates, if said ID information is not identical with ID information particular to a previous replaceable part stored in said storing means, contents of said storing means with the number of prints and said ID information stored in said second nonvolatile storing means.

3. The apparatus as claimed in claim 2, further comprising means for allowing the limit number of prints to be variably written to said first nonvolatile storing means.

4. The apparatus as claimed in claim 3, wherein the image forming condition setting is based on image density.

5. The apparatus as claimed in claim 3, wherein the image forming condition setting is based on a resource and energy save mode available for image formation.

6. The apparatus as claimed in claim 2, further comprising means for allowing the limit number of prints to be variably written to said first nonvolatile storing means.

7. The apparatus as claimed in claim 6, wherein the image forming condition setting is based on a resource and energy save mode available for image formation.

8. The apparatus as claimed in claim 1, wherein said controller stores ID (identification) information of an individual replaceable part in said second nonvolatile storing means, transfers said ID information to said first nonvolatile storing means when said replaceable part is used, reads said ID information out of said second nonvolatile storing means when said replaceable part is mounted to said apparatus body, and updates, if said ID information is not identical with ID information particular to a previous replaceable part stored in said first nonvolatile storing means, contents of said first nonvolatile storing means with said ID information stored in said second nonvolatile storing means.

9. The apparatus as claimed in claim 8, further comprising means for allowing the limit number of prints to be variably written to said first nonvolatile storing means.

10. The apparatus as claimed in claim 9, wherein the image forming condition setting is based on image density.

11. The apparatus as claimed in claim 9, wherein the image forming condition setting is based on a resource and energy save mode available for image formation.

12. The apparatus as claimed in claim 8, wherein the image forming condition setting is based on image density.

13. The apparatus as claimed in claim 8, wherein the image forming condition setting is based on a resource and energy save mode available for image formation.

14. The apparatus as claimed in claim 1, further comprising means for allowing the limit number of prints to be variably written to said first nonvolatile storing means.

15. The apparatus as claimed in claim 14, wherein the image forming condition setting is based on image density.

16. The apparatus as claimed in claim 14, wherein the image forming condition setting is based on a resource and energy save mode available for image formation.

17. The apparatus as claimed in claim 1, wherein the image forming condition setting is based on image density.

18. The apparatus as claimed in claim 1, wherein the image forming condition setting is based on a resource and energy save mode available for image formation.

19. An image forming apparatus comprising:

an apparatus body;

image forming means at least partly implemented by a replaceable part, which is removably mounted to said apparatus body;

counting means for counting prints output with the replaceable part;

first writable and readable nonvolatile storing means built in said apparatus body;

second writable and readable nonvolatile storing means built in the replaceable part; and a controller configured to store a limit number of prints particular to the replaceable part in said first nonvolatile storing means, to store, after an image forming operation, a cumulative number of prints printed by said replaceable part in said first nonvolatile storing means at least until the replaceable part is replaced with a different replaceable part and in said second nonvolatile storing means, and to report a time for replacing said replaceable part when said cumulative number stored in said first nonvolatile storing means exceeds said limit number of prints stored in said second nonvolatile storing means, wherein the controller is configured to determine an image forming condition setting and to increment a cumulative number stored in memory in the apparatus body by a number other than one for each of the prints sequentially output with the replaceable part while the image forming condition setting is set to a first of at least two available image forming condition settings.

20. The apparatus as claimed in claim 19, wherein said controller stores ID information of an individual replaceable part in said second nonvolatile storing means, transfers said ID information to said first nonvolatile storing means when said replaceable part is used, reads said ID information out of said second nonvolatile storing means when said replaceable part is mounted to said apparatus body, and updates, if said ID information is not identical with ID information particular to a previous replaceable part stored in said first nonvolatile storing means, contents of said first nonvolatile storing means with the number of prints and said ID information stored in said second nonvolatile storing means.

21. The apparatus as claimed in claim 20, further comprising means for allowing the limit number of prints to be variably written to said first nonvolatile storing means.

22. The apparatus as claimed in claim 20, wherein the image forming condition setting is based on image density.

23. The apparatus as claimed in claim 20, wherein the image forming condition setting is based on a resource and energy save mode available for image formation.

24. The apparatus as claimed in claim 20, wherein the image forming condition setting is based on image density.

25. The apparatus as claimed in claim 20, wherein the image forming condition setting is based on a resource and energy save mode available for image formation.

26. The apparatus as claimed in claim 19, further comprising means for allowing the limit number of prints to be variably written to said first nonvolatile storing means.

27. The apparatus as claimed in claim 26, wherein the image forming condition setting is based on image density.

28. The apparatus as claimed in claim 26, wherein the image forming condition setting is based on a resource and energy save mode available for image formation.

29. The apparatus as claimed in claim 19, wherein the image forming condition setting is based on image density.

30. The apparatus as claimed in claim 19, wherein the image forming condition setting is based on a resource and energy save mode available for image formation.

31. In an IC (Integrated Circuit) chip to be connected to a CPU (Central Processing Unit) built in an apparatus body of an image forming apparatus when removably mounted to said apparatus body, and including nonvolatile storing means allowing data to be written therein or read thereoutof under control of said CPU, said nonvolatile storing means stores ID information particular to said IC chip and a cumulative number of prints output by said apparatus body with said IC chip, the ID information and the cumulative number of prints are read out of said storing means and transferred to said apparatus body when said IC chip is mounted to said apparatus body, and after management information including the cumulative number of prints have been processed, an existing cumulative number of prints stored within the apparatus body at least until the IC chip is removed and replaced with a different IC chip is updated by the cumulative number of prints transferred from said IC chip, wherein the CPU is configured to determine an image forming condition setting and to increment the cumulative number of prints stored in memory in said apparatus body by a number other than one for each print sequentially output while the image forming condition setting is set to a first of at least two available image forming condition settings.

32. In a replaceable part included in image forming means of an image forming apparatus, an IC chip is built in said replaceable part and connected to a CPU built in an apparatus body of said image forming apparatus when removably mounted to said apparatus body, and including nonvolatile storing means allowing data to be written therein or read thereoutof under control of said CPU, said nonvolatile storing means stores ID information particular to said replaceable part and a cumulative number of prints output by said apparatus body with said IC chip, the ID information and the cumulative number of prints are read out of said storing means and transferred to said apparatus body and stored in the apparatus body when said IC chip is mounted to said apparatus body at least until the replaceable part is replaced with a different replaceable part, and after a cumulative number of prints output by said image forming apparatus with said replaceable part has been determined and after a time for replacing said replaceable part has been determined on the basis of said cumulative number of prints stored in said apparatus body, an existing cumulative number of prints stored in said storing means is updated by the cumulative number of prints transferred to said replaceable part from said apparatus body, wherein the CPU is configured to determine an image forming condition setting and to increment the cumulative number of prints stored in memory in said apparatus body by a number other than one for each of the prints sequentially output by said image forming apparatus with said replaceable part while the image forming condition setting is set to a first of at least two available image forming condition settings.

* * * * *